(12) United States Patent
McCorry et al.

(10) Patent No.: US 8,449,043 B2
(45) Date of Patent: May 28, 2013

(54) MULTI-PIECE VEHICLE WHEEL COVER RETENTION SYSTEM AND METHOD FOR PRODUCING SAME

(75) Inventors: Patrick McCorry, Plymouth, MI (US); Todd Duffield, Westland, MI (US); Thomas E. Heck, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 359 days.

(21) Appl. No.: 12/834,109

(22) Filed: Jul. 12, 2010

(65) Prior Publication Data

US 2012/0007415 A1    Jan. 12, 2012

(51) Int. Cl.
*B60B 7/04* (2006.01)
*B60B 7/08* (2006.01)

(52) U.S. Cl.
USPC .................................. 301/37.106; 301/37.102

(58) Field of Classification Search
CPC ................ B60B 7/04; B60B 7/08; B60B 7/065
USPC ............... 301/37.101, 37.102, 37.106, 37.42, 301/37.23, 37.24
See application file for complete search history.

(56) References Cited

U.S. PATENT DOCUMENTS

| | | | | |
|---|---|---|---|---|
| 3,252,738 A | * | 5/1966 | Huntley | 301/37.42 |
| 3,594,046 A | * | 7/1971 | Marshall | 301/37.42 |
| 3,669,501 A | | 6/1972 | Derieth | |
| 3,726,566 A | | 4/1973 | Beith | |
| 4,171,149 A | * | 10/1979 | Marks et al. | 301/37.42 |
| 5,031,966 A | | 7/1991 | Oakey | |
| 5,188,429 A | | 2/1993 | Heck et al. | |
| 5,340,418 A | | 8/1994 | Wei | |
| 5,360,261 A | | 11/1994 | Archibald et al. | |
| 5,368,370 A | | 11/1994 | Beam | |
| 5,421,642 A | | 6/1995 | Archibald | |
| 5,533,261 A | | 7/1996 | Kemmerer | |
| 5,564,792 A | | 10/1996 | Archibald | |
| 5,597,213 A | | 1/1997 | Chase | |
| 5,636,906 A | * | 6/1997 | Chase | 301/37.43 |
| 6,152,538 A | | 11/2000 | Ferriss et al. | |
| 6,346,159 B1 | | 2/2002 | Chase et al. | |
| 6,406,100 B1 | | 6/2002 | Kinstler | |
| 6,502,308 B1 | | 1/2003 | Carfora et al. | |

(Continued)

FOREIGN PATENT DOCUMENTS

DE    2813412 A1    10/1979

*Primary Examiner* — Kip T Kotter
(74) *Attorney, Agent, or Firm* — MacMillan, Sobanski & Todd, LLC

(57) ABSTRACT

A method for producing a multi-piece vehicle wheel retention system comprising the steps of: (a) providing a wheel having a wheel disc defining and axis and an outboard facing wheel surface and including an outboard tire bead seat retaining flange; (b) providing a first outer wheel cover formed from a first material, the first outer wheel cover covering at least a portion of outboard tire bead seat retaining flange of the wheel disc; (c) providing a second inner wheel cover formed from a second material, the second inner wheel cover covering at least a substantial portion of the outboard facing wheel surface of the wheel disc, the second wheel cover including an outboard surface and an inboard surface; (d) securing the first outer wheel cover and the second inner wheel cover together by at least an interference fit therewith; and (e) non-permanently securing the assembled wheel covers of step (d) and the wheel to one another by a non-permanent mechanical attachment feature to produce the multi-piece vehicle wheel retention system.

26 Claims, 13 Drawing Sheets

U.S. PATENT DOCUMENTS

| | | |
|---|---|---|
| 6,609,763 B1 | 8/2003 | Kinstler et al. |
| 6,779,852 B2 | 8/2004 | Van Houten et al. |
| 6,991,299 B2 | 1/2006 | Hauler |
| 8,052,223 B2 * | 11/2011 | McCorry et al. ............ 301/37.43 |
| 8,162,406 B2 * | 4/2012 | Heck et al. ................. 301/37.43 |
| 2010/0231029 A1 * | 9/2010 | Russell ...................... 301/37.31 |

* cited by examiner

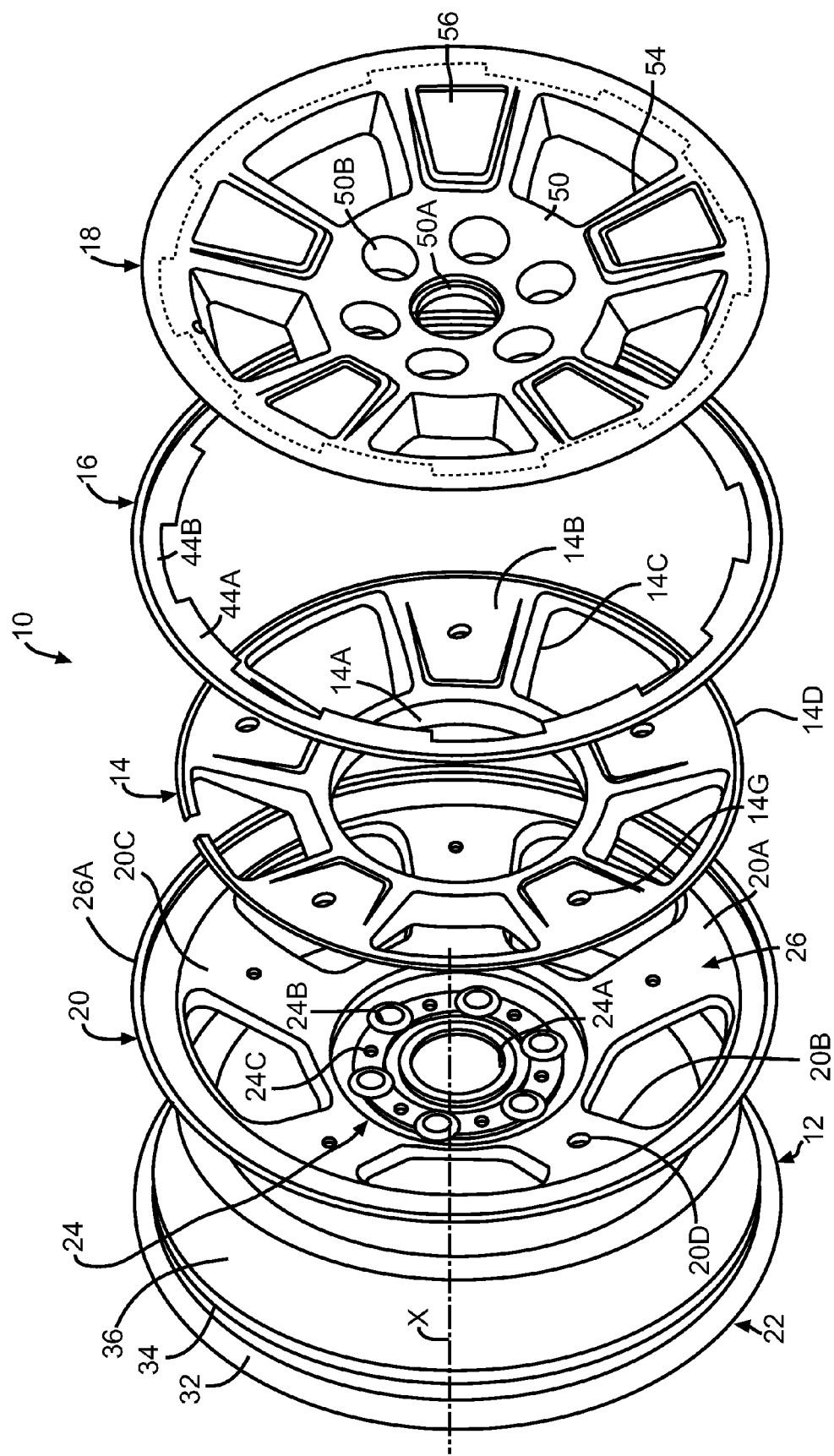

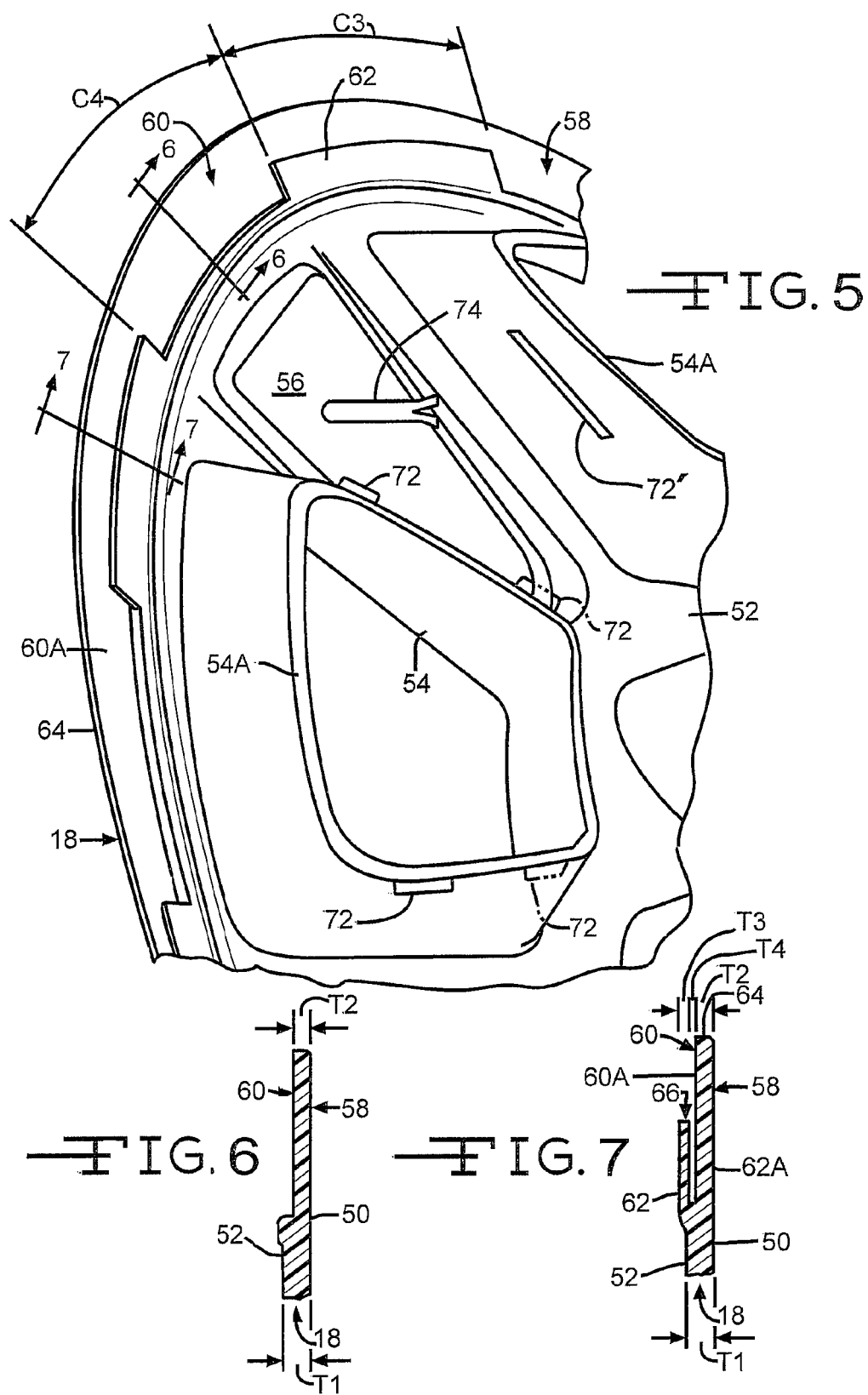

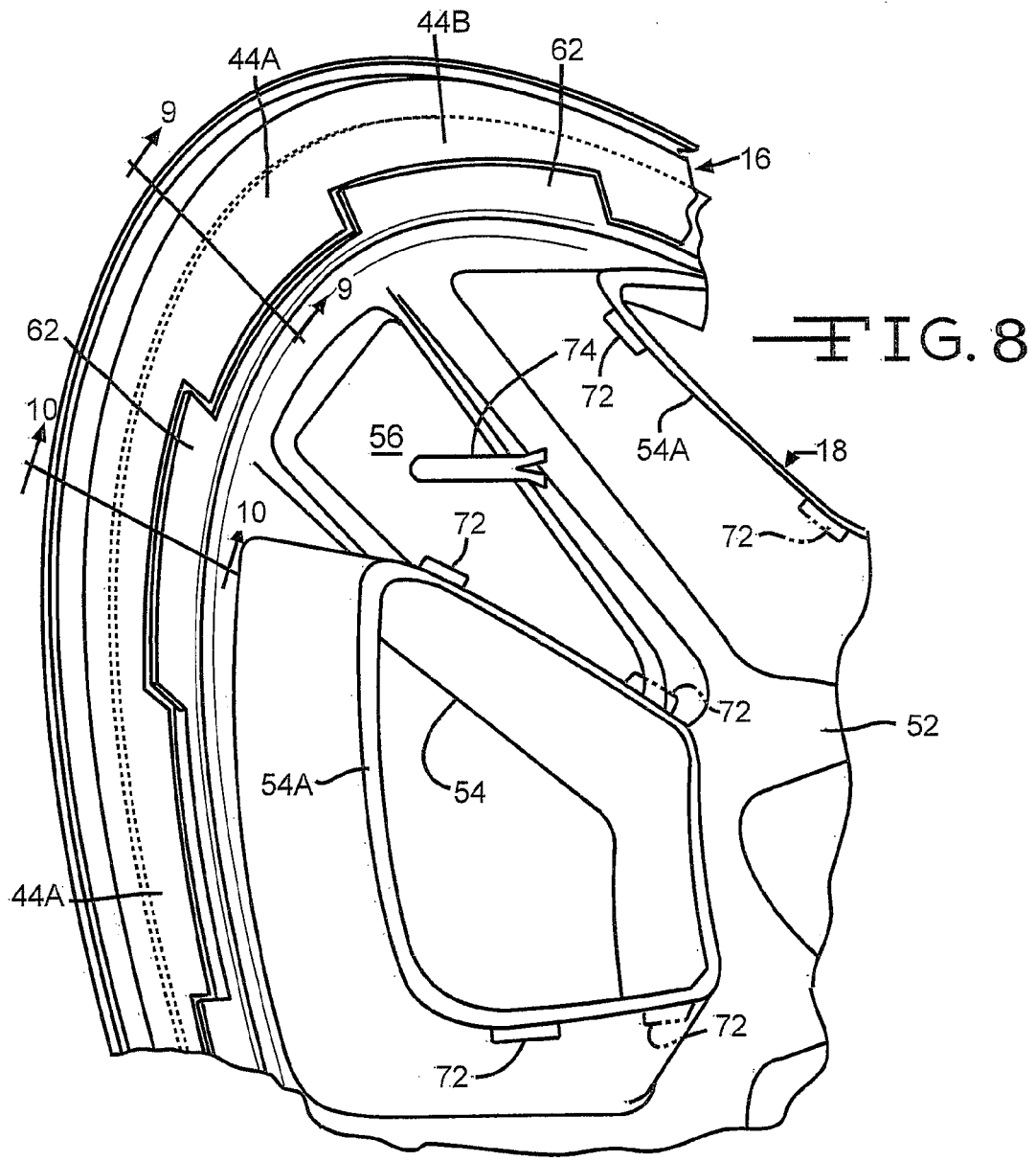
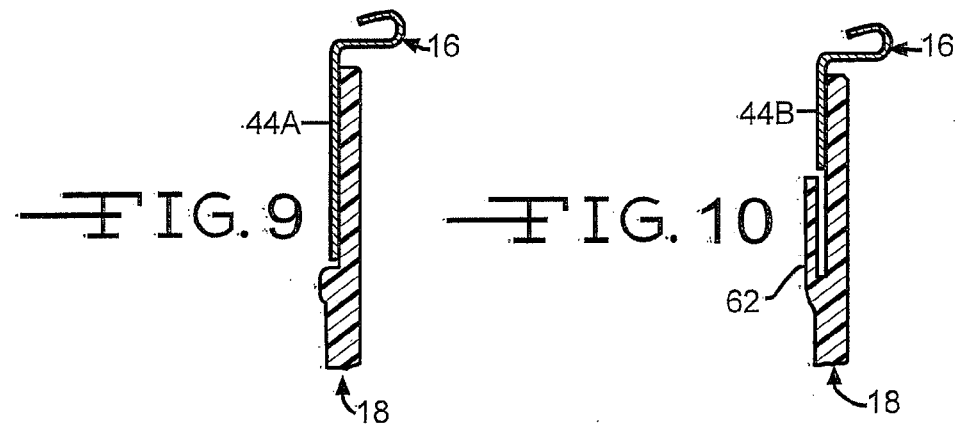

US 8,449,043 B2

MULTI-PIECE VEHICLE WHEEL COVER RETENTION SYSTEM AND METHOD FOR PRODUCING SAME

CROSS-REFERENCE TO RELATED APPLICATIONS

The present application is related to U.S. application Ser. No. 12/499,124, filed Jul. 8, 2009, now U.S. Pat. No. 8,052,223 B2, issued Nov. 8, 2011, and U.S. application Ser. No. 12/651,523, filed Jan. 4, 2010, now U.S. Pat. No. 8,162,406 B2, issued Apr. 24, 2012.

BACKGROUND OF THE INVENTION

This invention relates in general to vehicle wheels and, in particular, to an improved multi-piece vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue-joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

A yet further example of a vehicle wheel having a permanently secured wheel cover is disclosed in U.S. Pat. No. 5,368,370 to Beam. In the Beam patent, a chrome-plated stainless steel wheel cover includes an outer peripheral edge which is forced into engagement behind a catch formed in the outer rim flange to hold the wheel cover in place while an adhesive cures.

Still yet a further example of a vehicle wheel having a permanently secured wheel cover is disclosed in U.S. Pat. No. 3,726,566 to Beith. In the Beith patent, a steel, aluminum, or plastic wheel cover is secured to a wheel, and includes a terminal flange having a lip which is formed to grip the edge of the outboard tire bead seat retaining flange of the wheel.

Yet a further example of a vehicle wheel having a permanently secured wheel cover is disclosed in U.S. Pat. No. 6,152,538 to Ferriss et al. In the Ferriss et al. patent, a multi-piece wheel cover assembly is provided which is secured to the associated vehicle wheel.

Still further examples of vehicle wheels having permanently secured wheel covers are disclosed in U.S. Pat. No. 6,406,100 to Kinstler and U.S. Pat. No. 6,609,763 to Kinstler et al. In both of these two patents, a multi-piece wheel cover assembly is provided which is secured to the associated vehicle wheel.

SUMMARY OF THE INVENTION

This invention relates to a method for producing a multi-piece vehicle wheel retention system comprising the steps of: (a) providing a wheel having a wheel disc defining an axis and an outboard facing wheel surface and including an outboard tire bead seat retaining flange; (b) providing a first outer wheel cover formed from a first material, the first outer wheel cover covering at least a portion of outboard tire bead seat retaining flange of the wheel disc; (c) providing a second inner wheel cover formed from a second material, the second inner wheel cover covering at least a substantial portion of the outboard facing wheel surface of the wheel disc, the second wheel cover including an outboard surface and an inboard surface; (d) securing the first outer wheel cover and the second inner wheel cover together by at least an interference fit therewith; and (e) non-permanently securing the assembled wheel covers of step (d) and the wheel to one another by a non-permanent mechanical attachment feature to produce the multi-piece vehicle wheel retention system.

In another embodiment of the invention, a multi-piece wheel cover assembly is disclosed which comprises: a wheel having a wheel disc defining an axis and an outboard facing wheel surface and including an outboard tire bead seat retaining flange; a first outer wheel cover formed from a first material, the first outer wheel cover covering at least a portion of outboard tire bead seat retaining flange of the wheel disc; and a second inner wheel cover formed from a second material, the second inner wheel cover covering at least a substantial portion of the outboard facing wheel surface of the wheel disc, the second wheel cover including an outboard surface and an inboard surface; wherein the first outer wheel cover and the second inner wheel cover are attached together by at least an interference fit therewith to produce an assembled wheel cover assembly; and wherein the assembled wheel cover assembly is non-permanently secured to the wheel by a non-permanent mechanical attachment feature to produce the multi-piece vehicle wheel retention system.

In yet another embodiment, a method for producing a multi-piece vehicle wheel retention system is disclosed comprising the steps of: (a) providing a wheel having a wheel disc defining an axis and an outboard facing wheel surface and including an outboard tire bead seat retaining flange; (b) providing a first outer wheel cover formed from a first material, the first outer wheel cover covering at least a portion of outboard tire bead seat retaining flange of the wheel disc; (c) providing a second inner wheel cover formed from a second material, the second inner wheel cover covering at least a substantial portion of the outboard facing wheel surface of the wheel disc, the second wheel cover including an outboard surface and an inboard surface; (d) providing an insert formed from a third material and which generally corresponds to at least the shape of a space which formed between the outboard facing wheel surface of the wheel and the inboard surface of the second wheel cover, the insert including an outboard surface and an inboard surface; (e) securing the first outer wheel cover and the second inner wheel cover together by at least an interference fit therewith; and (f) non-permanently securing the assembled wheel covers of step (e), the insert and the wheel to one another by a non-permanent mechanical attachment feature to produce the multi-piece vehicle wheel retention system.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an exploded perspective view of a first embodiment of a multi-piece vehicle wheel cover retention system.

FIG. 5 is a view showing the initial assembly of the associated wheel cover of the multi-piece vehicle wheel cover retention system illustrated in FIG. 1.

FIG. 6 is a sectional view taken along line 6-6 of FIG. 5.

FIG. 7 is a sectional view taken along line 7-7 of FIG. 5.

FIG. 8 is a view showing the next step of the assembly of the associated vehicle wheel cover of the multi-piece vehicle wheel cover retention system illustrated in FIG. 1

FIG. 9 is a sectional view taken along line 9-9 of FIG. 8.

FIG. 10 is a sectional view taken along line 10-10 of FIG. 8.

FIG. 14A of a sectional view through another portion of the assembled multi-piece vehicle wheel cover retention system according to the first embodiment.

FIG. 14B of a sectional view through yet another portion of the assembled multi-piece vehicle wheel cover retention system according to the first embodiment.

DETAILED DESCRIPTION OF THE INVENTION

Figure 3:
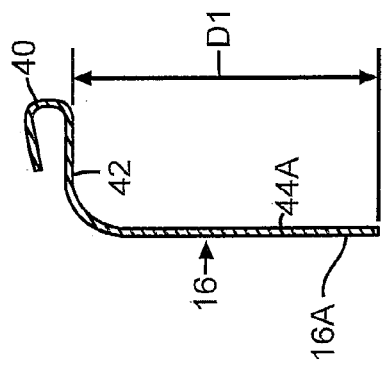
FIG. 3 is a sectional view taken along line 3-3 of FIG. 2.
Figure 4:
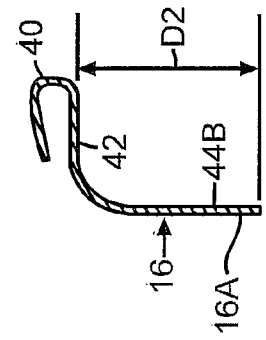
FIG. 4 is a sectional view taken along line 4-4 of FIG. 2.

Referring now to FIG. 1, there is illustrated an exploded perspective view of a first embodiment of a multi-piece vehicle wheel cover retention system, indicated generally at 10, according to the present invention. Although the present invention is illustrated and described in conjunction with the particular vehicle wheel constructions disclosed herein, it will be appreciated that the invention can be used in conjunction with other types of vehicle wheel constructions, if so desired. For example, as shown herein or with modifications thereto, the present invention may be used in connection with associated vehicle wheels formed from any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "fabricated well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euroflange type of wheel such as shown in U.S. Pat. No. 5,564,792 to Archibald, the disclosures of all of these patents incorporated by reference in entirety herein.

As shown therein, the first embodiment of a multi-piece vehicle wheel cover retention system 10 includes a vehicle wheel 12, an insert 14, and a multi-piece wheel cover including a first "outer" wheel cover 16 and a second "inner" wheel cover 18. In the illustrated embodiment, the vehicle wheel 12 is a fabricated full face vehicle wheel (best shown in FIG. 14), and includes an outer full face wheel disc 20 and an inner partial wheel rim 22 which are joined together by one or more welds W.

The wheel disc 20 can be formed from any suitable material, such as for example, steel, aluminum, alloys thereof, magnesium, or titanium. In the illustrated embodiment, the wheel disc 20 defines a wheel axis X and includes a generally centrally located inner wheel mounting surface or portion 24, an outer annular portion 26, and defines an outer surface or outboard face 20A of the vehicle wheel 10. The inner mounting surface 24 of the wheel disc 20 is provided with a center hub hole 24A and a plurality of lug bolt mounting holes 24B spaced circumferentially around the center hub hole 24A. The lug bolt receiving holes 24B are adapted to receive lug bolts (not shown) and nuts (not shown) for securing the vehicle wheel 10 on an axle (not shown) of a vehicle. The outer annular portion 26 includes an outer end 26A which defines an outboard tire bead seat retaining flange of the vehicle wheel 10. Also, as shown in this embodiment, the wheel disc 20 further includes a plurality of windows or openings 20B formed therein between each pair of spokes 20C. Alternatively, as discussed above, the construction, material and/or make-up of the wheel disc 20 may be other than illustrated if so desired.

The wheel rim 22 can be formed from any suitable material, such as for example, steel, aluminum, alloys thereof, magnesium, or titanium. In the illustrated embodiment, the wheel rim 22 includes an inboard tire bead seat retaining flange 32, an inboard tire bead seat 34, a well 36, and an outboard tire bead seat 38. Alternatively, as discussed above, the construction, material and/or make-up of the wheel rim 22 may be other than illustrated if so desired.

Figure 14:
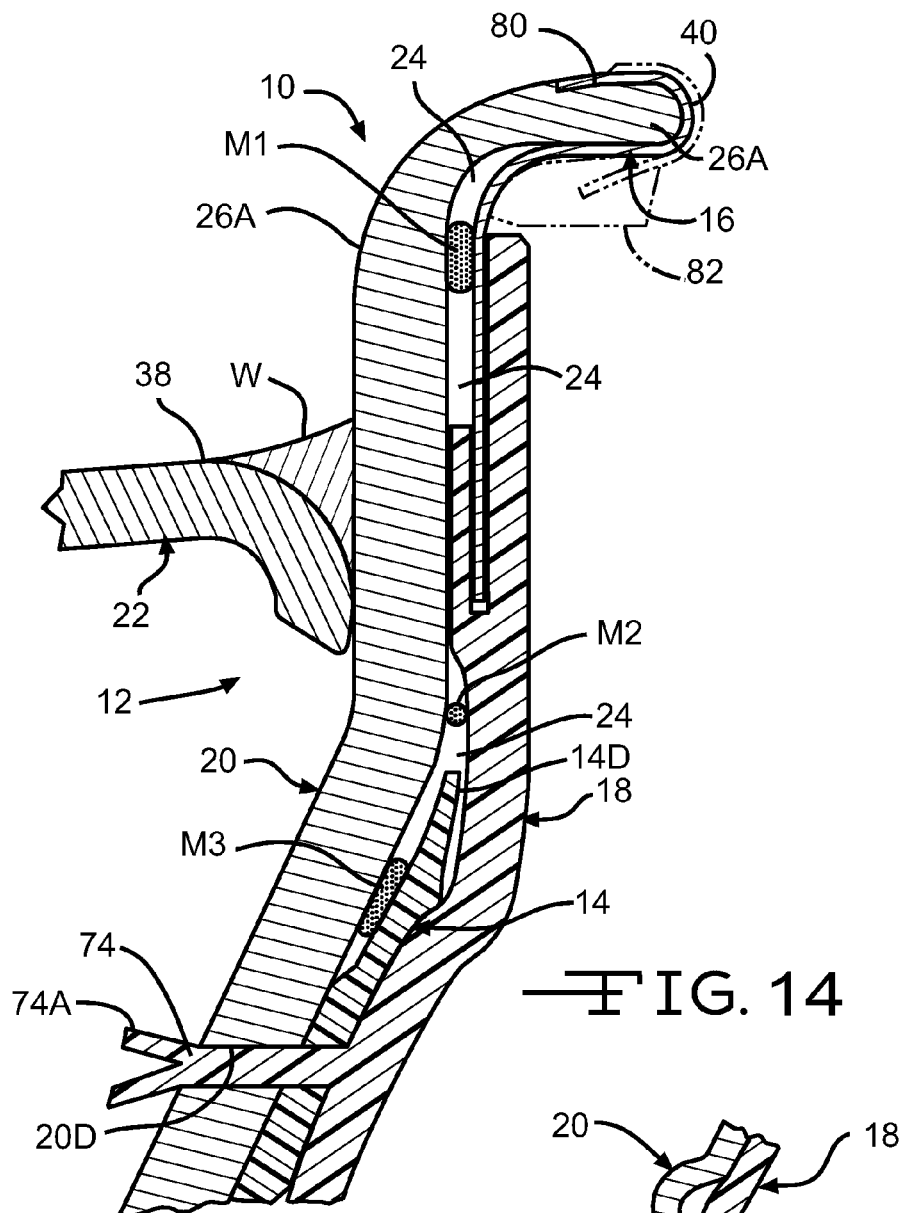
FIG. 14 of a sectional view through of a portion of the assembled multi-piece vehicle wheel cover retention system according to the first embodiment.

In the illustrated embodiment, the insert 14 is preferably a preformed insert formed from a suitable material, such as for example, a suitable foam material. Alternatively, the insert 14 can be formed from other suitable materials and/or can be formed in-situ directly onto the assembled wheel covers 16 and 18 if so desired. Also, depending upon the particular shape of the vehicle wheel 12 and the assembled wheel covers 16 and 18, the insert 14 may not be necessary. However, as shown in FIG. 14, in the illustrated embodiment due to the particular construction of the vehicle wheel 12 and the covers 16 and 18, the insert 14 is preferably used to fill a space which is formed between the outboard face 20A of the wheel 12 and associated inner surface of at least the second wheel cover 18 to result in a "solid" sound rather than a "hollow" sound if the first and second covers 16 and 18 are "tapped" by a person.

In the illustrated embodiment, the insert 14 preferably generally corresponds to the shape of the space which is formed between the outboard face 20A of the wheel 12 and at least a portion of an associated inboard face or surface 52 of at least the wheel cover 18. Alternatively, the insert 14 could also fill at least part of a space which is formed between the outboard face 20A of the wheel and at least a portion of an associated inboard face or surface 16A of at least a portion of the wheel cover 16 is do desired. In the illustrated embodiment, the insert 14 includes a central opening 14A, spokes 14B, windows 14C, and an outer annular portion 14D.

In the illustrated embodiment, the first wheel cover 16 is preferably a preformed wheel cover formed from a metal material. More preferably, the first wheel cover 16 is formed from stainless steel having a thickness of approximately 0.020 inch, and is painted, chrome-plated, or brightly polished. Alternatively, the first wheel cover 16 can be formed from other materials if desired. For example, the first wheel cover 16 can be formed from other metals and non-metals, such as for example, aluminum and plastic. Preferably, an outboard surface of the first wheel cover 16 is finished to match an outboard surface of the second wheel cover 18; however, the first wheel cover 16 and the second wheel cover 18 can have different finishes if desired.

Figure 2:
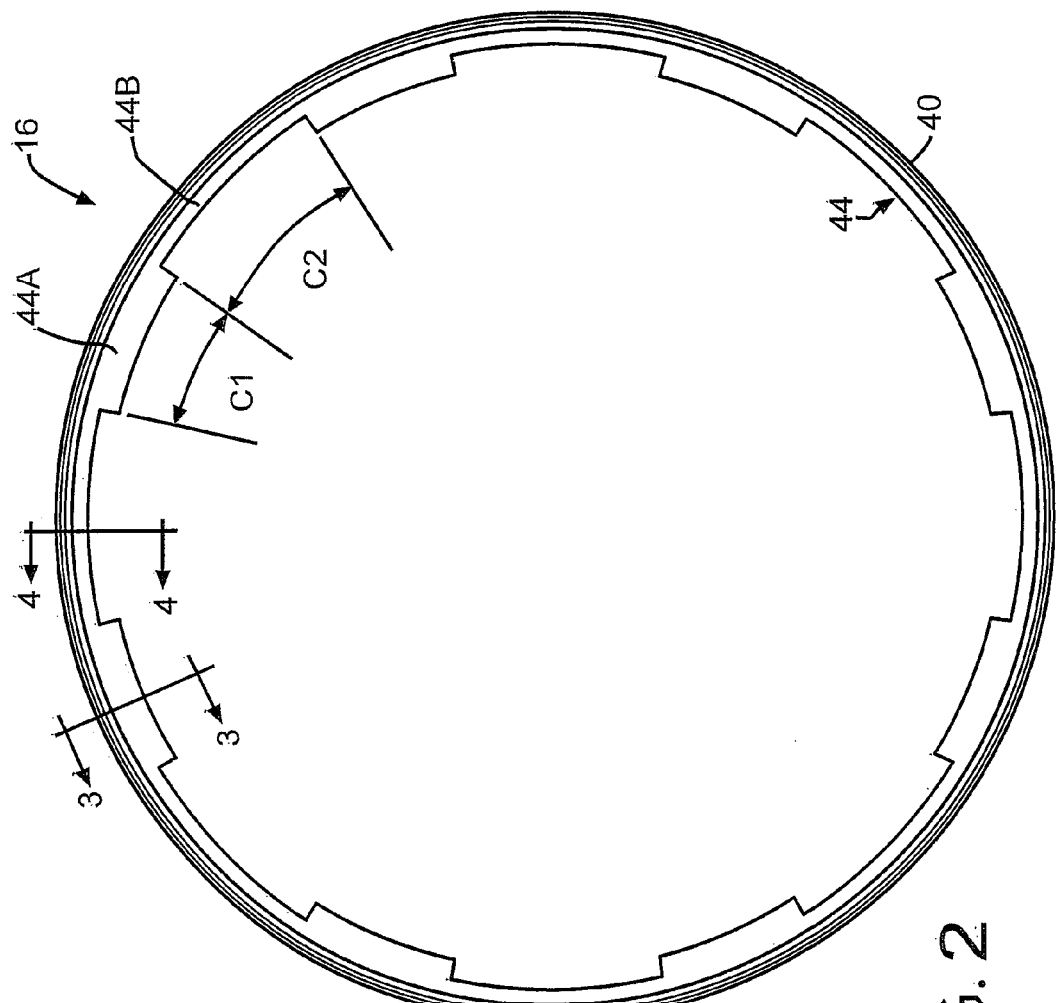
FIG. 2 is a plan view of a portion of the vehicle wheel cover retention system illustrated in FIG. 1, showing a portion of the associated multi-piece vehicle wheel cover.

As shown in FIGS. 2-4, the first wheel cover 16 is preferably formed from a single piece of material by a stamping operation to produce the unique annular shape best shown in FIG. 2. As shown therein, the first wheel cover 16 includes a generally U-shaped or inverted outer end 40, a first leg 42, and a second leg, indicated generally at 44. The first leg 42 extends generally parallel with respect to the axis X and the second leg 44 extends generally perpendicular to the first leg 42.

As will be discussed below, in the illustrated embodiment, the second leg 44 of the first wheel cover 16 is segmented and includes a plurality of first leg members 44A and a plurality of second leg members 44B. The first leg members 44A extend a first radial distance D1 and the second leg members 44B extend a second radial distance D2 which is less than the first radial distance D1. In the illustrated embodiment, the first leg members 44A extend a first angular extent C1 and the second leg members 44B extend a second angular extent C2 which is greater than the first angular extent C1. Alternatively, the first wheel cover 16 can be formed from other suitable methods, such as for example, by taking a strip or band of material having a desired shape and forming the strip into an annular hoop and welding the ends together. Also, the outer end 40 of the first wheel cover 16 does not have to be preformed prior to assembly onto the associated vehicle wheel 10 but may be formed after assembly onto the vehicle wheel 10. Suitable methods for forming the outer end 40 after assembly are disclosed in U.S. Pat. No. 6,406,100 to Kinstler, U.S. Pat. No. 6,502,308 to Carfora et al., and U.S. Pat. No. 6,609,763 to Kinstler et al., the disclosures of each of these patents incorporated by reference herein in entirety. Alternatively, the construction of the first wheel cover 16 may be other than illustrated if so desired.

In the illustrated embodiment the second wheel cover 18 is preferably formed from a plastic material and is painted or chrome-plated. The second wheel cover 18 can be prefabricated to generally match the particular configuration of the outboard facing surface of the associated vehicle wheel or, as illustrated, can have portions which are spaced apart from the outboard facing surface 20A of the wheel to provide for styling. Alternatively, the second wheel cover 18 can be formed from other materials, such as for example, aluminum or stainless steel, if so desired.

As shown in this embodiment, the second wheel cover 18 includes an outboard face or surface 50 and the inboard face or surface 52, as shown in FIGS. 5-8 and 11. The second wheel cover 18 is provided with a center hub hole 50A, and a plurality of lug bolt mounting holes 50B spaced circumferentially around the center hub hole 50A. Also, as shown in this embodiment, the second wheel cover 18 further includes a plurality of wheel cover decorative windows 54 formed therein between each pair of "solid" spokes 56.

As best shown in FIGS. 5-8 and 11, an outer peripheral edge, indicated generally at 58, of the inboard surface 52 of the second wheel cover 18 includes a unique configuration having a surface feature provided on the inboard surface 52 thereof for receiving and securing the first wheel cover 16 therewith. In particular, in the illustrated embodiment, the outer peripheral edge 58 of the inboard surface 52 is segmented and includes a generally non-raised or flat continuous surface, indicated generally at 60, and a plurality of spaced apart raised arcuate or circumferentially extending fingers 62 spaced circumferentially away from the surface 60. In the illustrated embodiment, the fingers 62 extend a third angular extent C3 and as shown in FIG. 7, extend outwardly toward but stop short of an outermost circumferential side edge 64 of the second wheel cover 18. As a result of this, a circumferential channel or groove 66 is formed in the outer peripheral edge 58 of the second wheel cover 18 between the adjacent opposed surfaces 60A and 62A of the flat portion 60 and the fingers 62, respectively. The flat portion 60 of the outer peripheral edge 58 which extends between each of the pair of fingers 62 extends a fourth angular extent C4. In the illustrated embodiment, the angular extent C1 of the first wheel cover 16 has to be at least slightly less than the angular extent C4 of the second wheel cover 18, and the angular extent C2 of the first wheel cover 16 has to be at least slightly greater than the angular extent C3 of the second wheel cover 18 for a purpose to be explained below.

As can be seen in the illustrated embodiment, in FIGS. 6 and 7 the second wheel cover 18 defines a generally uniform cover thickness T1 adjacent inwardly relative to the outer peripheral edge 58 thereof. As shown in FIG. 6, the flat portion 60 of the outer peripheral edge 58 define a thickness T2 which is less than the thickness T1. As shown in FIG. 7, the finger 62 defines a thickness T3 and the channel 66 defines a thickness T4. As can be seen in the illustrated embodiment, the combined thicknesses T2, T3 and T4 is greater than the thickness T1. Alternatively, the construction of the second wheel cover 18 may be other than illustrated if so desired.

Figure 18:
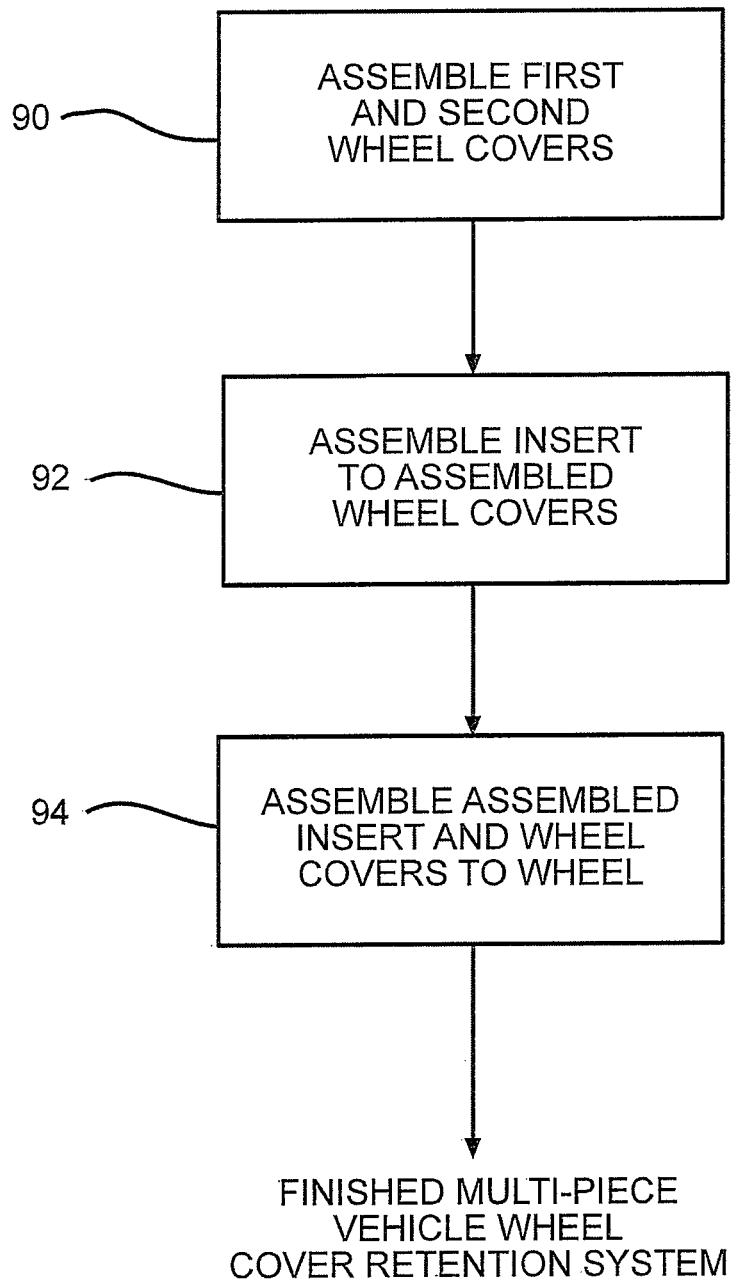
FIG. 18 is a flow chart illustrating a first embodiment of a sequence of steps for producing an embodiment of the multi-piece vehicle wheel cover retention system of the present invention.

Referring now to FIG. 18, there is illustrated a block diagram showing an embodiment of a sequence of steps of assembly for producing the multi-piece vehicle wheel cover retention system 10 of the present invention. Preferably, as shown therein, in a first step 90 of the illustrated embodiment of the assembly process, the first wheel cover 16 is secured to the second wheel cover 18. To accomplish this in the illustrated embodiment, as shown in FIGS. 8-10 the first wheel cover 16 is initially disposed adjacent the second wheel cover 18 with the second leg 44 of the first wheel cover 16 adjacent the flat surface 60 of the second wheel cover 18. More particularly, a respective one of each of the first leg members 44A of the first wheel cover 16 is disposed in the space created between each pair of fingers 62 of the second wheel cover 18 (also shown in FIG. 9), and a respective one of each of the second leg members 44B of the first wheel cover 16 is disposed above or outwardly with respect to a respective one of each of the fingers 62 of the second wheel cover 18 (also shown in FIG. 10).

Figure 11:
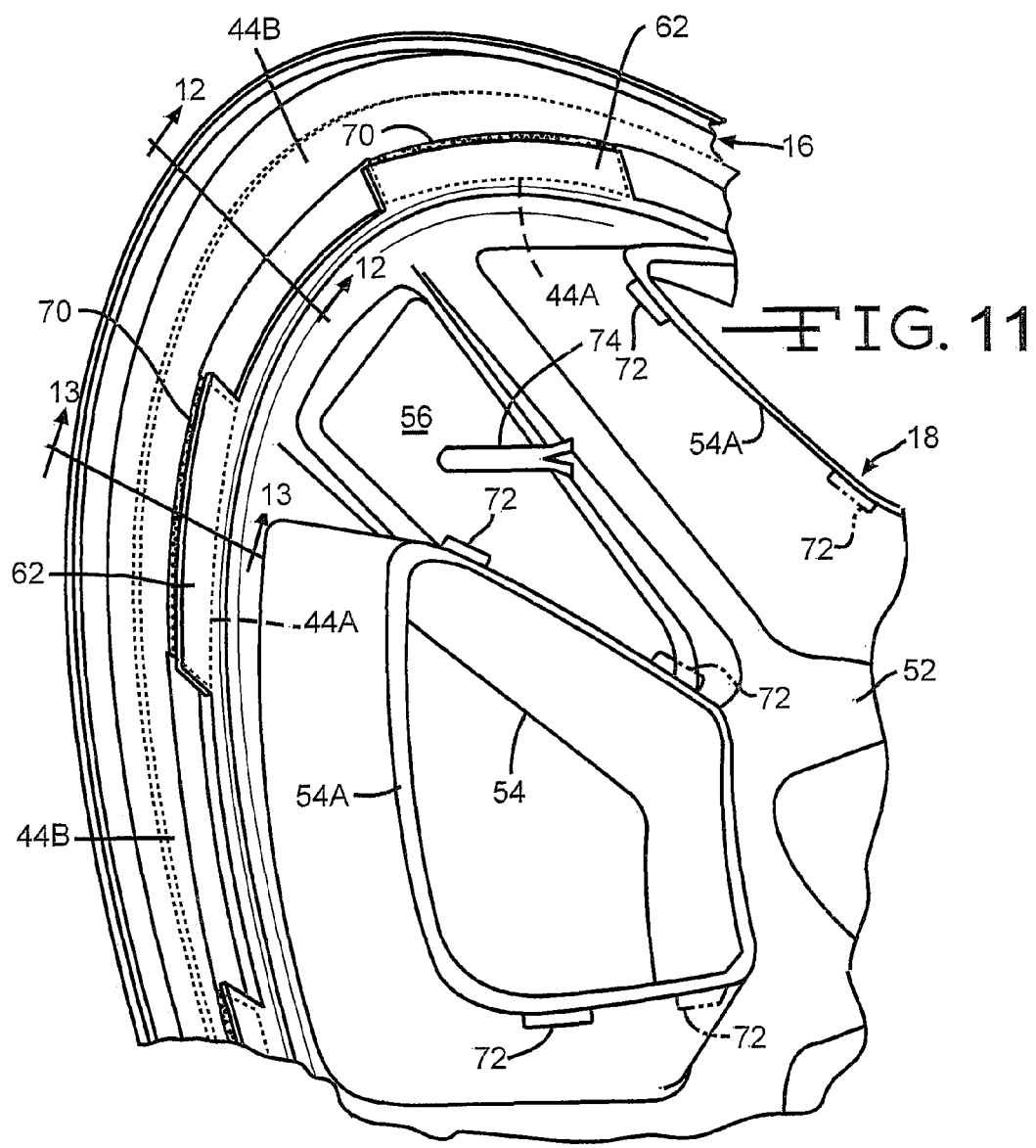
FIG. 11 is a view showing the final step of the assembly of the associated vehicle wheel cover of the multi-piece vehicle wheel cover retention system illustrated in FIG. 1
Figures 12, 13:
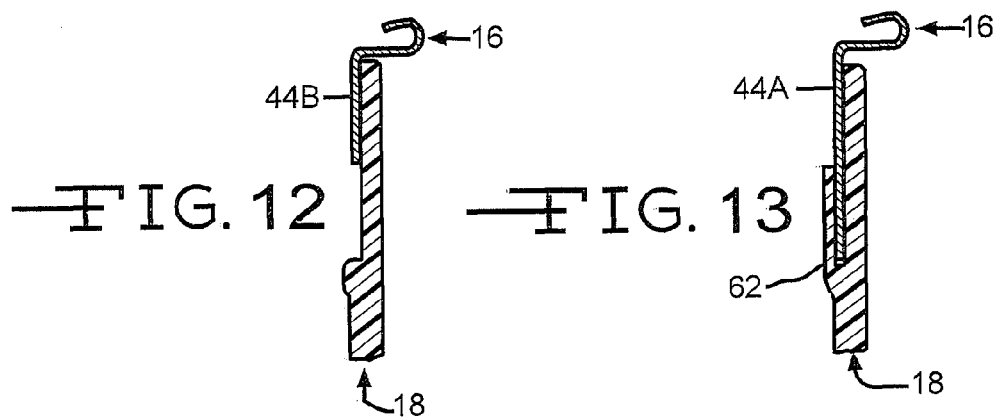
FIG. 12 is a sectional view taken along line 12-12 of FIG. 11.
FIG. 13 is a sectional view taken along line 13-13 of FIG. 11.

Next, preferably the first wheel cover 16 is rotated or "clocked" in either a clockwise or counterclockwise direction relative to the second wheel cover 18 such that a respective one of the first leg members 44A of the first wheel cover 16 is moved into an associated corresponding recess 66 of the second wheel cover 18, as shown in FIGS. 11 and 13, and a respective one of the second leg members 44B is disposed in the space created between each pair of fingers 62 of the second wheel cover 18 (as shown in FIG. 12). The first leg members 44A are preferably received within the recesses 66 in an interference fit therewith. Also, preferably a suitable adhesive (partially shown in FIG. 11 at 70), may be used to further aid in securing the first wheel cover 16 to the second wheel cover 18. The adhesive 70 could be applied to either the first leg member 44A, the recess 66 or both prior to the above "clocking" step.

Following the securing of the first wheel cover 16 and the second wheel cover 18 together in step 90, in the next step 92 in the illustrated embodiment of the assembly process the assembled wheel covers 16 and 18 are releasably attached to the insert 14. Preferably to accomplish this in the illustrated embodiment, the wheel cover 18 is provided with one or more "short" tabs or legs 72 (as shown in FIGS. 5, 8 and 11), and/or with one or more "long" tabs or legs 72' (as shown in FIG. 5), being shown disposed for example, on one or mores sides 54A of the associated wheel cover windows 54 thereof. The tabs 72 and/or 72' are operative to retain the assembled wheel covers 16 and 18 by a snap fit engagement to the insert 14. In addition, during this step, a plurality of generally axially extending "long" legs or posts 74, such as shown in FIG. 5, which are provided on the inboard surface 52 of the wheel cover 18 on each of the spokes 56 thereof between each pair of the decorative windows 54, extend through aligned openings 14G provided in the insert 14 for a purpose to be discussed below.

Following this, in the illustrated embodiment of the assembly process the assembled wheel covers 16 and 18 and insert 14 are releasably attached to the wheel 12 in step 94. Preferably to accomplish this, the posts 74 extend through aligned openings 20D provided in the wheel disc 20. As can be seen in the illustrated embodiment, the posts 74 have ends 74A which are squeezed together or compressed inwardly so that once the posts 74 pass through the openings 20D, the ends 74A of the posts 74 can expand outwardly (as shown in FIG. 14), to retain the assembled wheel covers 16 and 18 and the insert to the wheel 12 and produce the multi-piece vehicle wheel cover retention system 10. Preferably, the configuration and/or the structure of the posts 74 is such that once the posts 74 are pushed through the openings 20D there is a sufficient force exerted by the posts 74 which urges or forces the assembled wheel covers 16 and 18 and the insert 14 against the wheel so that there is no free play therebetween which could result in undesirable noise and/or rattle. Alternatively, the configuration, construction, number and/or location of the posts 74 can be other than illustrated if so desired. For example, the posts 74 can include any suitable type of an end 74A which is capable of attaching the assembled wheel covers 16 and 18 and the insert to the wheel 12, such as for example, "push-in" type of ends that do not use any additional fastener, "push-on" type of ends which use a suitable type of push-on fastener, or the like, in a removable manner if so desired.

Figure 19:
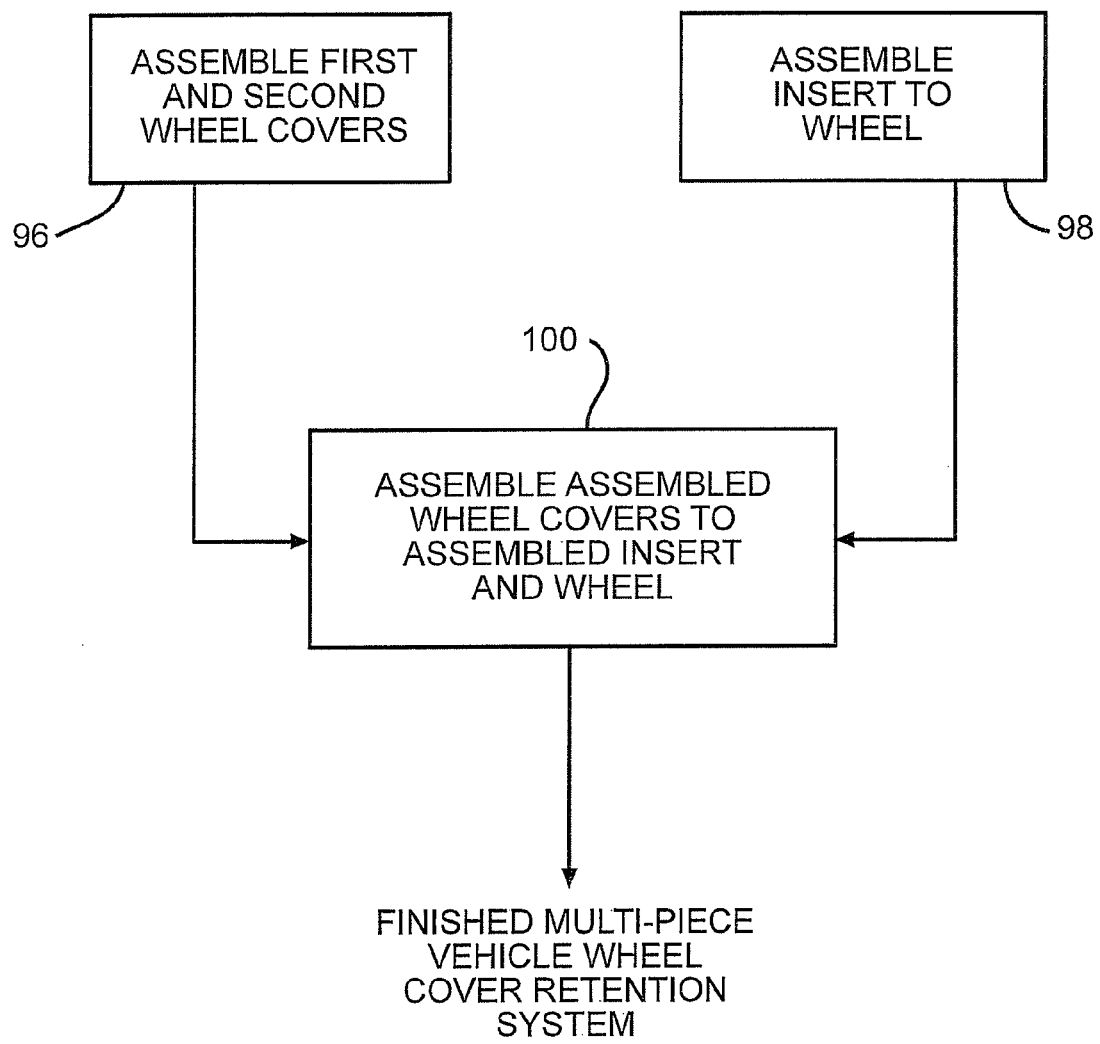
FIG. 19 is a flow chart illustrating a second embodiment of a sequence of steps for producing an embodiment of the multi-piece vehicle wheel cover retention system of the present invention.

Also, as shown in FIG. 14A, the wheel cover 18 in the illustrated embodiment may further be provided with a plurality of generally axially extending "long" legs or posts 76, provided on the inboard surface 52 thereof between each pair of the lug bolt mounting holes 50B. During step 94, the posts 76 extend through aligned openings 24C provided in the inner mounting surface 24 of the wheel disc 20. As can be seen in the illustrated embodiment, the posts 76 have smooth ends 76A which pass through the openings 24C and receive a suitable "push-on" fastener 78 thereon to retain the assembled wheel covers 16 and 18 and the insert to the wheel 12 and produce the multi-piece vehicle wheel cover retention system 10. Preferably, the fastener 78 is pushed on the post 76 with a sufficient force to urge or force the assembled wheel covers 16 and 18 and the insert 14 against the wheel so that there is no free play therebetween which could result in undesirable noise and/or rattle. Alternatively, the configuration, construction, number and/or location of the posts 76 can be other than illustrated if so desired. For example, the posts 76 can include any suitable type of an end 76A which is capable of attaching the assembled wheel covers 16 and 18 and the insert to the wheel 12, such as for example, "push-in" type of ends that do not use any additional fastener, such as illustrated in this embodiment by post 74 with end 74A, "push-on" type of ends which use a suitable type of push-on fastener, such as illustrated in this embodiment by post 76 with end 76A and fastener 78, or the like, in a removable manner if so desired. Alternatively, the configuration, construction, type, number, location and/or the combination or use thereof of one or more of the tabs 72 and 72' and/or the posts 74 and 76 can be other than illustrated and described if so desired as long as they preferably function or operate in a manner capable of attaching the assembled wheel covers 16 and 18 and the insert 14, if it is used, to the wheel 12 in a manner which allows such components to be removed if so desired for any reasons, such as for example, replacement, repair or servicing. Alternatively, the assembly process for producing the multi-piece vehicle wheel cover retention system 10 may be other than illustrated and described if so desired. For example, as shown in FIG. 19, the insert 14 may be first disposed against the wheel 12 in step 98 and then the prior assembled wheel covers 16 and 18 of step 96 may then be attached to this prior assembled wheel 12 and insert 14 assembly in step 100 to produce the multi-piece vehicle wheel cover retention system 10.

Also, in order to assist in retaining the associated parts of the multi-piece vehicle wheel cover retention system 10 together, other non-permanent fixing surface features, members or systems, such as snap tabs, projections, and fasteners, may be used if so desired. For example, as shown in FIG. 14B, a member 78A, which can be formed integral with the second wheel cover 18 or formed separate therefrom, may be provided which can be engaged by the lug nuts during installation to assist in retaining the associated parts of the multi-piece vehicle wheel cover retention system 10 together. Also, the second wheel cover 18 may include tabs or projections (not shown) adjacent the lug bolt openings 50B which after assembly engage behind the lug bolt openings 24B of the wheel disc 20 to assist in retaining the associated parts of the multi-piece vehicle wheel cover retention system 10 together. Alternatively, other non-permanent fixing surface features, members or systems, such as snap tabs, projections, and fasteners, provided on the first wheel cover 16 and/or the second wheel cover 18 may be used if so desired.

Also, as shown in FIG. 14, suitable material or materials may be utilized if so desired and may be disposed between adjacent selective surfaces of the inboard surface 16A of the first wheel cover 16 and the outer surface 20A of the wheel disc 20; between adjacent selective surfaces of the inboard surface 52 of the second wheel cover 18 and the outer surface 20A of the wheel disc 20; and/or between adjacent selective surfaces of the inboard surface 14E of the insert 14 and the outer surface 20A of the wheel disc 20 if the insert 14 is used in the construction of the multi-piece vehicle wheel cover retention system 10. Suitable material would be any such suitable material which would be capable of providing or performing one or more of the following features: reducing any gap(s) between such adjacent selective surfaces; providing for noise dampening between such adjacent selective surfaces; and/or providing for a non-permanent attachment between such adjacent selective surfaces. Such suitable materials may include for example, rubber, foam, sealants, silicones, insulating and damping materials. The selected material and/or materials may be applied, secured, and/or deposited in any suitable manner, pattern, or means on one or more of the adjacent selective surfaces of the covers 16 and 18, the insert 14 and/or the wheel disc 20, but such selected material and/or materials would not be capable of permanently securing the assembled wheel covers 16 and 18 and/or the assembled wheel covers 16 and 18 and the insert 14, if it is used, to the wheel 12. In the illustrated embodiment, there is shown a material M1 disposed between adjacent selective surfaces of the inboard surface 16A of the first wheel cover 16 and the outer surface 20A of the wheel disc 20, a material M2 disposed between adjacent selective surfaces of the inboard surface 52 of the second wheel cover 18 and the outer surface 20A of the wheel disc 20, and a material M3 disposed between adjacent selective surfaces of the inboard surface 14E of the insert 14 and the outer surface 20A of the wheel disc 20. Alternatively, if used, the configuration, composition and location of one or more the materials M1, M2 and M3 can be other than illustrated if so desired.

Further, as shown in FIG. 14, in the illustrated embodiment the outer end 40 of the first wheel cover 16 is preferably disposed in a circumferential, radially outwardly facing groove 80 formed in an inner surface of the outboard tire bead seat retaining flange 26A so that the first wheel cover 16 does not interfere with the attachment of a wheel balance weight 82 (shown in phantom). Alternatively, the outer end 40 of the first wheel cover 16 may be other than illustrated and described if so desired. For example, the outer end 40 may not extend all the way around so as to cover the entire portion of a remote end 26A' of the outboard tire bead seat retaining flange 26A if so desired.

Figure 15:
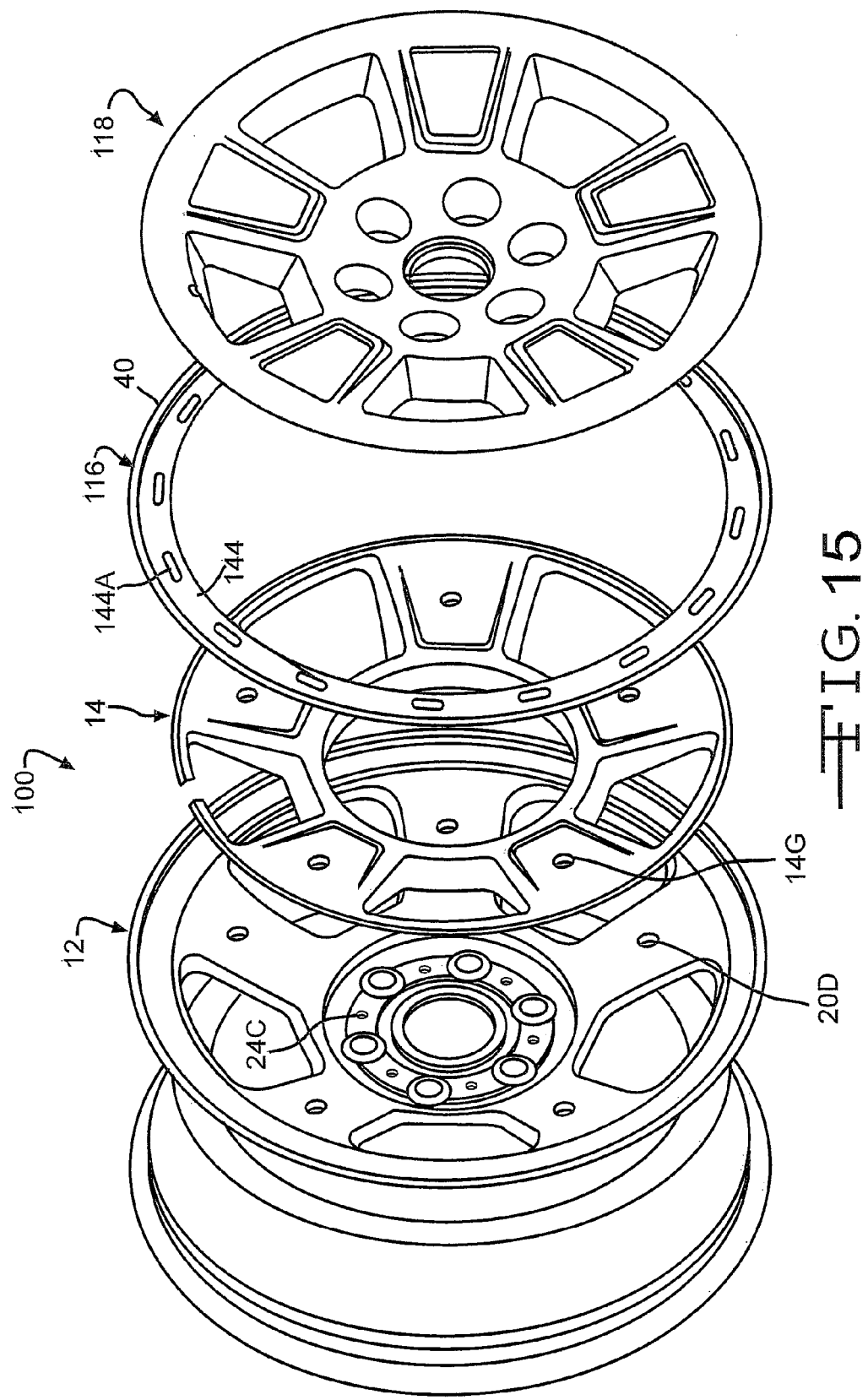
FIG. 15 is an exploded perspective view of a second embodiment of a multi-piece vehicle wheel cover retention system.

Referring now to FIG. 15 and using like reference numbers to indicate corresponding parts, there is illustrated an exploded perspective view of a second embodiment of a multi-piece vehicle wheel cover retention system, indicated generally at 100, according to the present invention. In this embodiment, a first wheel cover 116 and a second wheel cover 118 are provided and which use a different method of securement compared to the first wheel cover 16 and the second wheel cover 18 described above in connection with the first embodiment of the multi-piece vehicle wheel cover retention system 10. Thus, only those portions of the second embodiment of the multi-piece vehicle wheel cover retention system 100 which differ from the first embodiment of the multi-piece vehicle wheel cover retention system 10 will be discussed in detail below. In addition, in this embodiment, an insert (shown in phantom at 114) is optionally provided and may or may not be necessary depending upon the particular wheel configuration.

Figure 16:
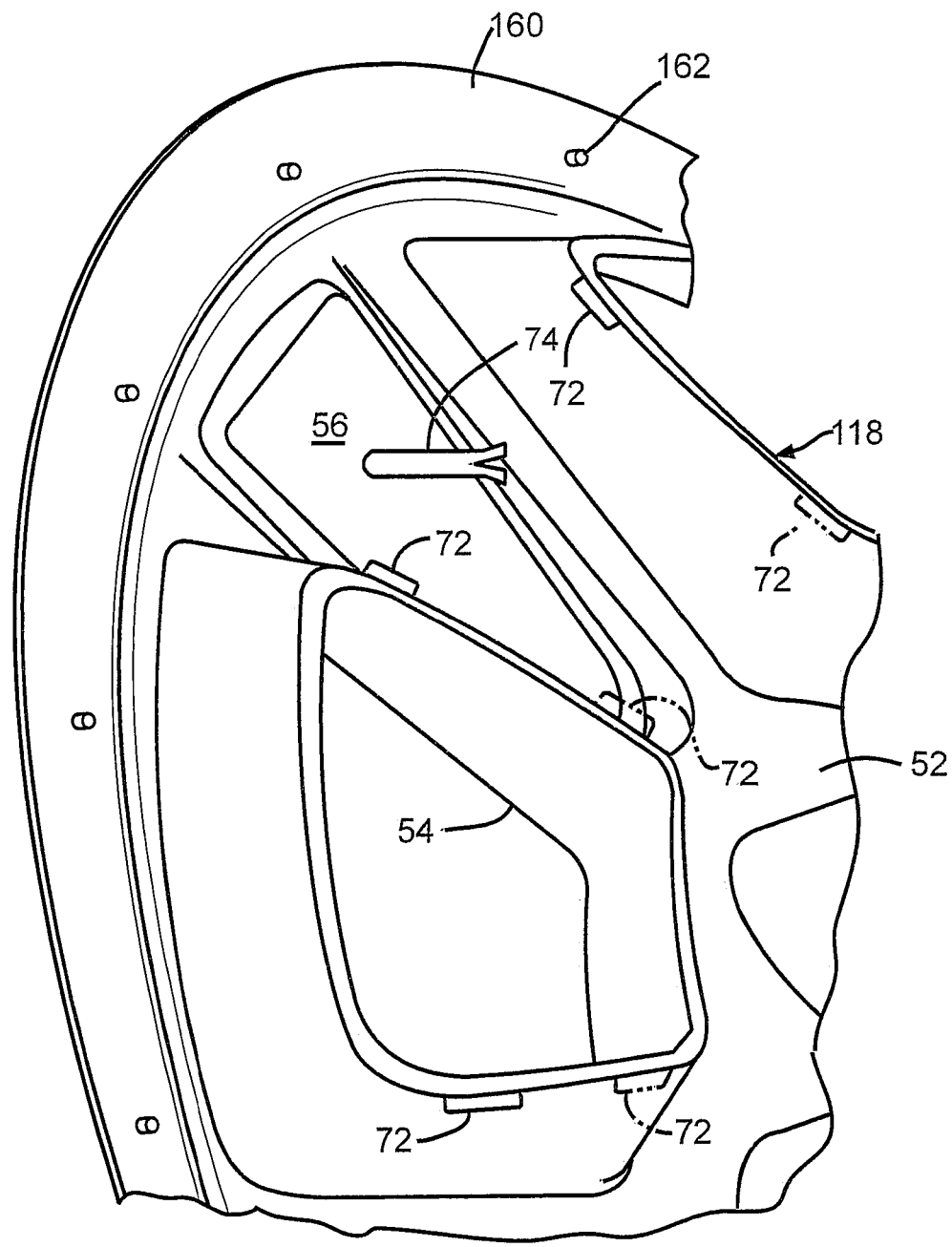
FIG. 16 is a plan view of a portion of the multi-piece vehicle wheel cover retention system illustrated in FIG. 15, showing a portion of the associated vehicle wheel cover, prior to assembly thereof.
Figure 17:
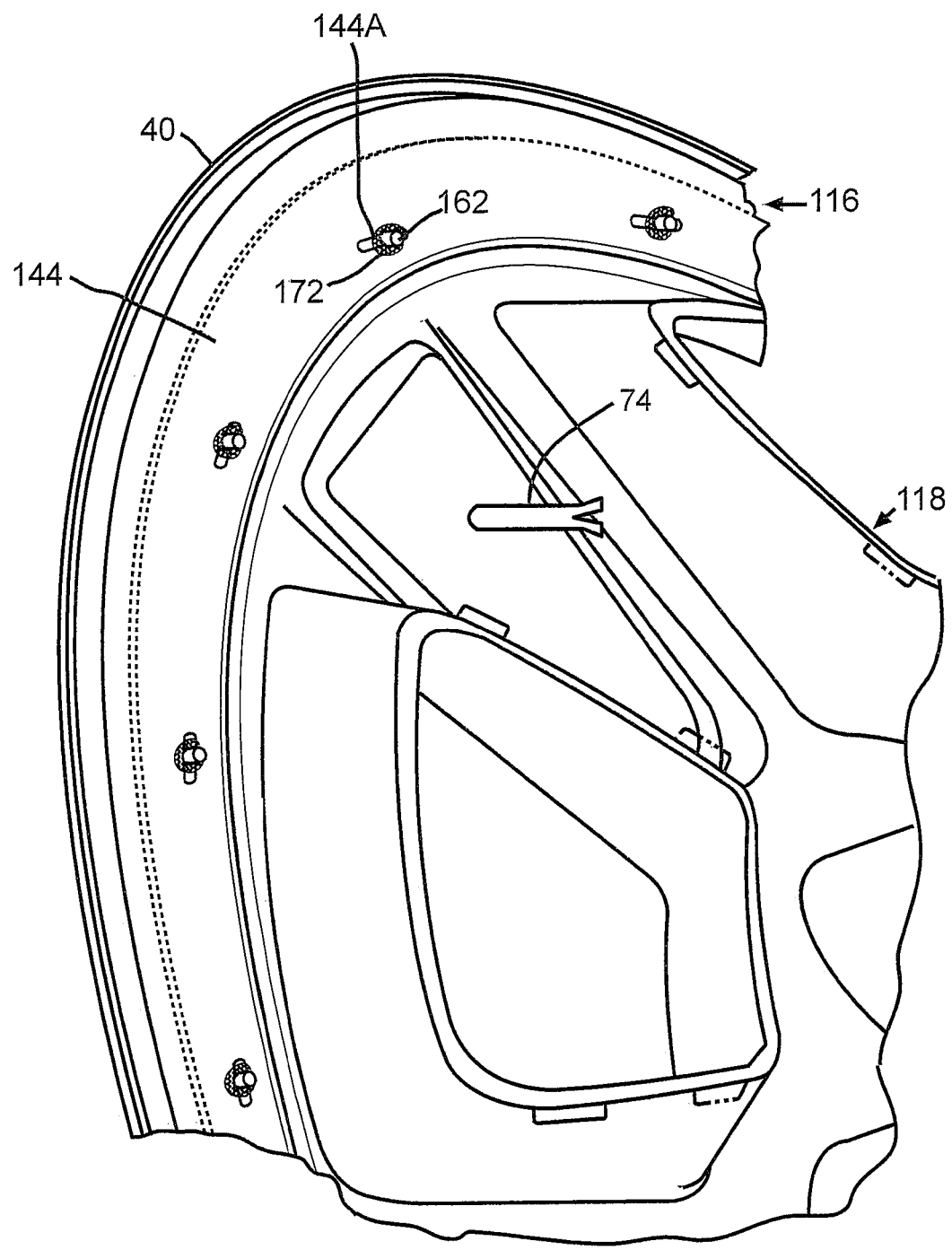
FIG. 17 is a plan view of a portion of the multi-piece vehicle wheel cover retention system illustrated in FIG. 15, showing a portion of the associated vehicle wheel cover following assembly thereof.

As shown in FIG. 15, in this embodiment the first wheel cover 116 is provided with a plurality of openings or slots 144A provided in a second leg 144 thereof. As shown in FIG. 16, in this embodiment the second wheel cover 118 is provided with a surface feature comprising a plurality of upstanding tabs or protuberances 162 extending from a generally flat continuous surface 160 thereof. As a result of this, as shown in FIG. 17, the first wheel cover 116 is secured to the second wheel cover 118 by passing the tabs 162 through the openings 144A preferably in an interference fit therewith. An adhesive (shown at 172 in FIG. 17, may be used to further aid in securing the first wheel cover 116 to the second wheel cover 118. The adhesive could be applied to either the tabs 166, the openings 144A or both prior to the above assembling step. Alternatively, the shape, number or configuration of the openings 144A and/or the tabs 162 may be other than illustrated if so desired.

Figure 20:
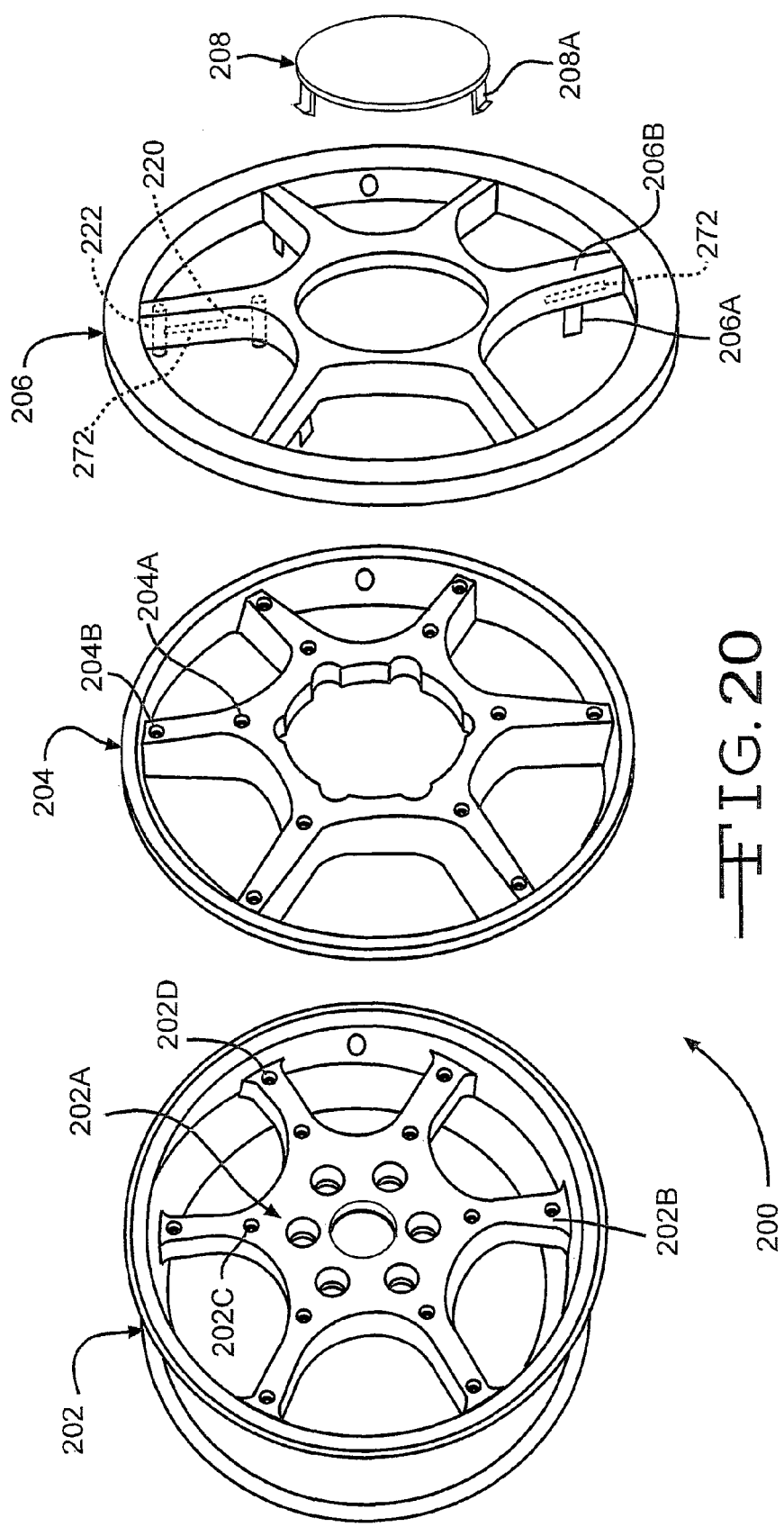
FIG. 20 is an exploded perspective view of a third embodiment of a multi-piece vehicle wheel cover retention system.

Referring now to FIG. 20 and using like reference numbers to indicate corresponding parts, there is illustrated an exploded perspective view of a third embodiment of a multi-piece vehicle wheel cover retention system, indicated generally at 200, according to the present invention. In this embodiment, the vehicle wheel cover retention system 200 includes a wheel 202, an optional insert 204, a wheel cover 206 and a center cap 208.

In the illustrated embodiment, the center cap 208 may be releasably secured to the cover 206 or the wheel 202 via tabs 208A. Alternatively, the cover 206 may be similar to the cover 18 discussed above wherein the cover 206 would extend inwardly toward the wheel center so as to cover an associated inner wheel mounting portion 202A of the wheel 202 so that the center cap 208 is not needed.

Also, to attach the insert 204 and cover 206 to the wheel 202 the cover 206 may include "push-in" posts (only one of such posts 220 is shown in FIG. 20 in phantom but the posts 220 can be similar to the post 74 shown in the embodiment illustrated in FIGS. 1-14) and "push-on" posts (only one of such posts 222 is shown in FIG. 20 in phantom but the posts 222 can be similar to the post 76 shown in the embodiment illustrated in FIGS. 1-14). The posts 220 extend through aligned openings 204A and 202C provided in the insert 204 and the wheel 202, respectively, and the posts 222 extend through aligned openings 204B and 202D provided in the insert 204 and the wheel 202, respectively.

Alternatively or in combination with the posts 220 and 222, in the case of a stainless steel cover 206, the cover 206 may include one or more tabs 206A, such as shown in FIG. 20, provided on the back side of the cover 206, such as adjacent one or more of a plurality of spokes 206B thereof. Following assembly, the tabs 206A are adapted to be bent over into contact with a spoke 202B of the wheel 202 to secure the cover 206, and therefore the insert 204, to the wheel 202 while the adhesive cures. In addition to one or more of the posts 220, the posts 22 and/or the tabs 206A and/or in place of one or more thereof, the cover 206 may have other suitable non-permanent fixing surface features, members or systems, which are operative to attach the associated component(s) to the wheel 202 to produce the multi-piece vehicle wheel cover retention system 200, if so desired. For example, if the cover 206 is formed from plastic, the cover 206 may include one or more snap tabs (two of such snap tabs 272 shown in phantom in FIG. 20), molded on the underside or back side of the cover 206 which are operative to snap into openings (not shown) provided in the insert 204 to secure the cover 206 and the insert 204 together.

Figure 21:
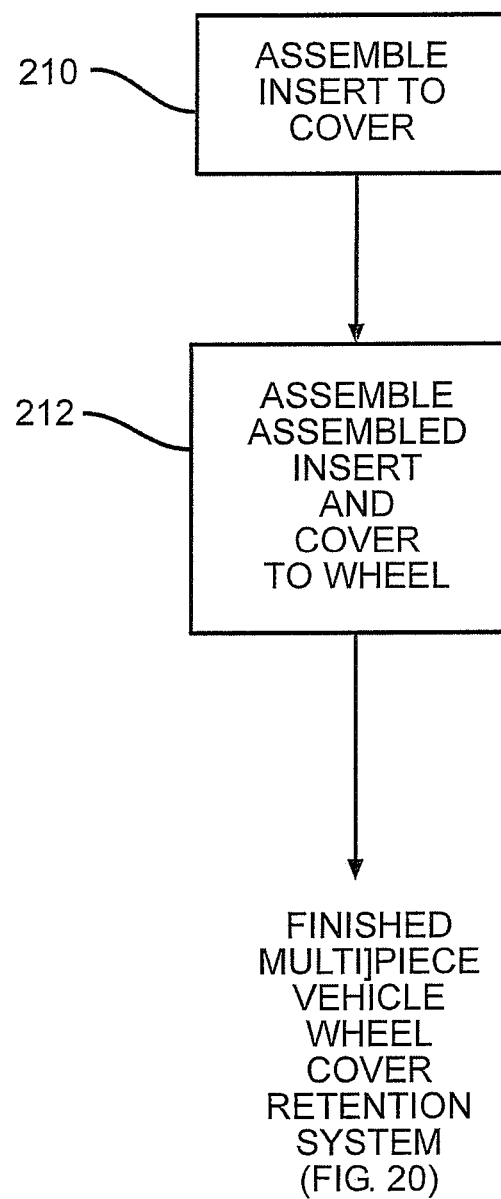
FIG. 21 is a flow chart illustrating a third embodiment of a sequence of steps for producing an embodiment of the multi-piece vehicle wheel cover retention system of the present invention.

Turning now to FIG. 21, there is illustrated an assembly process which can be used to produce the multi-piece vehicle wheel cover retention system 200 of this embodiment. As shown therein, in the assembly process one may first secure the insert 204 to the cover 206 in step 210 and then the assembled insert 204 and cover 206 to wheel 202 in step 212. Alternatively, the assembly process for this embodiment of the multi-piece vehicle wheel cover retention system 200 may be other than illustrated and described if so desired.

Also, depending upon the particular multi-piece vehicle wheel cover retention system structure, configuration or other factors or characteristics thereof, it may be desirable or preferable to use a suitable adhesive or adhesives selectively applied between selected surfaces of one or both of the wheel covers, the optional insert and the associated wheel to facilitate the assembly and/or the retention of the wheel covers and the optional insert to the associated wheel. However, if such an adhesive(s) is used, it is understood that such use would not result in a permanent or non-removable attachment of the components to the wheel but would rather still enable the components to be removed from the wheel if so desired.

One advantage of the present invention is that multi-piece vehicle wheel cover retention system 10, 100 and 200 covers substantially the entire visible area of the outboard face of the associated vehicle wheel. As a result, the multi-piece vehicle wheel cover retention system 10, 100 and 200 completely disguises the configuration of the associated underlying base structural vehicle wheel.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A method for producing a multi-piece vehicle wheel cover retention system comprising the steps of:
   (a) providing a wheel having a wheel disc defining and axis and an outboard facing wheel surface and including an outboard tire bead seat retaining flange;
   (b) providing a first outer wheel cover formed from a first material, the first outer wheel cover covering at least a portion of outboard tire bead seat retaining flange of the wheel disc;
   (c) providing a second inner wheel cover formed from a second material, the second inner wheel cover covering at least a substantial portion of the outboard facing wheel surface of the wheel disc, the second wheel cover including an outboard surface and an inboard surface;
   (d) providing an insert formed from a third material and which generally corresponds to at least the shape of a space formed between the outboard facing wheel surface of the wheel and the inboard surface of the second wheel cover, the insert including an outboard surface and an inboard surface;
   (e) securing the first outer wheel cover and the second inner wheel cover together by at least an interference fit therewith; and
   (f) non-permanently securing the assembled wheel covers of step (e), the insert and the wheel to one another by a non-permanent mechanical attachment feature to produce the multi-piece vehicle wheel retention system.

2. The method of claim 1 wherein the first outer wheel cover includes a generally U-shaped outer end, a first leg which extends generally parallel with respect to the axis, and a second leg which extends generally perpendicular to the first leg, and wherein at least a portion of the second leg of the first outer wheel cover extends behind the second inner wheel cover so as to be adjacent the inboard surface of the second inner wheel cover and wherein the at least a portion of the second leg of the first outer wheel cover is at least secured to the second wheel cover by the at least a portion of the second leg being disposed within a surface feature provided only on the inboard surface of the second inner wheel cover to thereby secure the first outer wheel cover and the second inner wheel cover together in the interference fit therewith.

3. The method of claim 2 wherein step (e) includes applying an adhesive on at least one of the inboard surface of the second inner wheel cover and an outboard surface of the first wheel cover in the area of the surface feature to permanently secure the first outer wheel cover to the second inner wheel cover.

4. The method of claim 1 wherein the second inner wheel cover is provided with at least one surface feature provided thereon which provides the non-permanent mechanical attachment feature for non-permanently securing the assembled wheel covers and the insert to the wheel.

5. The method of claim 4 wherein the at least one surface feature is an axially extending post provided on an inboard surface of the second inner wheel cover which is adapted to extend through an opening provided in the wheel.

6. The method of claim 5 wherein the post includes one of a push-in type of end and a push-on type of end.

7. The method of claim 1 wherein the second inner wheel cover is provided with a center hub hole and a plurality of windows formed therein between each of a pair spokes, and wherein a plurality of surface features are provided thereon which provide the non-permanent mechanical attachment for non-permanently securing the assembled wheel covers and the insert to the wheel.

8. The method of claim 7 wherein the plurality of surface features are provided thereon in an area adjacent the center hub hole.

9. The method of claim 7 wherein the second inner wheel cover includes a plurality of lug bolt openings, and wherein a respective one of the plurality of surface features is provided between each pair of the lug bolt openings.

10. The method of claim 7 wherein of a respective one of the plurality of surface features is provided between each pair of the windows.

11. The method of claim 7 wherein the second inner wheel cover includes a plurality of lug bolt openings, and wherein the said plurality of surface features of said second inner wheel cover include a first plurality of surface features and a second plurality of surface features, a respective one of the first plurality of surface features provided between each pair of the lug bolt openings and a respective one of the second plurality of surface features is provided between each pair of the windows.

12. The method of claim 1 wherein the first outer wheel cover is formed from a metal material, the second inner wheel cover is formed from a plastic material, and the insert is formed from a foam material.

13. A method for producing a multi-piece vehicle wheel cover retention system comprising the steps of:
(a) providing a wheel having a wheel disc defining and axis and an outboard facing wheel surface and including an outboard tire bead seat retaining flange;
(b) providing a first outer wheel cover formed from a first material, the first outer wheel cover covering at least a portion of outboard tire bead seat retaining flange of the wheel disc;
(c) providing a second inner wheel cover formed from a second material, the second inner wheel cover covering at least a substantial portion of the outboard facing wheel surface of the wheel disc, the second wheel cover including an outboard surface and an inboard surface;
(d) securing the first outer wheel cover and the second inner wheel cover together by at least an interference fit therewith; and
(e) non-permanently securing the assembled wheel covers of step (d) and the wheel to one another by a non-permanent mechanical attachment feature to produce the multi-piece vehicle wheel retention system, wherein the second inner wheel cover is provided with at least one surface feature provided thereon which provides the non-permanent mechanical attachment feature for non-permanently securing the assembled wheel covers to the wheel.

14. The method of claim 13 wherein the first outer wheel cover includes a generally U-shaped outer end, a first leg which extends generally parallel with respect to the axis, and a second leg which extends generally perpendicular to the first leg, and wherein at least a portion of the second leg of the first outer wheel cover extends behind the second inner wheel cover so as to be adjacent the inboard surface of the second inner wheel cover and wherein the at least a portion of the second leg of the first outer wheel cover is at least secured to the second wheel cover by the at least a portion of the second leg being disposed within a surface feature provided only on the inboard surface of the second inner wheel cover to thereby secure the first outer wheel cover and the second inner wheel cover together in the interference fit therewith.

15. The method of claim 13 wherein step (d) includes applying an adhesive on at least one of the inboard surface of the second inner wheel cover and an outboard surface of the first wheel cover in the area of the at least one surface feature to permanently secure the first outer wheel cover to the second inner wheel cover.

16. The method of claim 13 wherein the at least one surface feature is a an axially extending post provided on an inboard surface of the second inner wheel cover which is adapted to extend through an opening provided in the wheel.

17. The method of claim 16 wherein the post includes one of a push-in type of end and a push-on type of end.

18. The method of claim 13 wherein the second inner wheel cover is provided with a center hub hole and a plurality of windows formed therein between each of a pair spokes, and wherein a plurality of surface features are provided thereon which provide the non-permanent mechanical attachment for non-permanently securing the assembled wheel covers to the wheel.

19. The method of claim 18 wherein the plurality of surface features are provided thereon in an area adjacent the center hub hole.

20. The method of claim 18 wherein the second inner wheel cover includes a plurality of lug bolt openings, and wherein a respective one of the plurality of surface features is provided between each pair of the lug bolt openings.

21. The method of claim 18 wherein of a respective one of the plurality of surface features is provided between each pair of the windows.

22. The method of claim 18 wherein the second inner wheel cover includes a plurality of lug bolt openings, and wherein the second inner wheel cover is provided with a first plurality of surface features and a second plurality of surface features provided therein, a respective one of the first plurality of surface features provided between each pair of the lug bolt openings and a respective one of the second plurality of surface features is provided between each pair of the windows.

23. The method of claim 13 wherein the first wheel cover is formed from a metal material and the second wheel cover is formed from a plastic material.

24. A multi-piece vehicle wheel cover retention system comprising:
a wheel having a wheel disc defining and axis and an outboard facing wheel surface and including an outboard tire bead seat retaining flange;
a first outer wheel cover formed from a first material, the first outer wheel cover covering at least a portion of outboard tire bead seat retaining flange of the wheel disc; and
a second inner wheel cover formed from a second material, the second inner wheel cover covering at least a substantial portion of the outboard facing wheel surface of the wheel disc, the second wheel cover including an outboard surface and an inboard surface;
wherein the first outer wheel cover and the second inner wheel cover are attached together by at least an interference fit therewith to produce an assembled wheel cover assembly; and
wherein the assembled wheel cover assembly is non-permanently secured to the wheel by a non-permanent mechanical attachment feature to produce the multi-piece vehicle wheel retention system;
wherein the second inner wheel cover is provided with at least one surface feature provided thereon which provides the non-permanent mechanical attachment feature for non-permanently securing the assembled wheel covers to the wheel.

25. The multi-piece vehicle wheel cover retention system of claim 24 wherein the first outer wheel cover includes a generally U-shaped outer end, a first leg which extends generally parallel with respect to the axis, and a second leg which extends generally perpendicular to the first leg, and wherein at least a portion of the second leg of the first outer wheel cover extends behind the second inner wheel cover so as to be adjacent the inboard surface of the second inner wheel cover and wherein the at least a portion of the second leg of the first outer wheel cover is at least secured to the second wheel cover by the at least a portion of the second leg being disposed within a surface feature provided only on the inboard surface of the second inner wheel cover to thereby secure the first outer wheel cover and the second inner wheel cover together in the interference fit therewith.

26. The multi-piece vehicle wheel cover retention system of claim 24 wherein the at least one surface feature is a an axially extending post provided on an inboard surface of the second inner wheel cover which is adapted to extend through an opening provided in the wheel.

* * * * *